(12) United States Patent
Kim

(10) Patent No.: US 12,723,953 B2
(45) Date of Patent: Sep. 1, 2026

(54) IMAGE CALIBRATION SLIDE

(71) Applicant: Vieworks Co., Ltd., Anyang-si (KR)

(72) Inventor: Byeongyeon Kim, Suwon-si (KR)

(73) Assignee: Vieworks Co., Ltd., Anyang-si (KR)

( * ) Notice: Subject to any disclaimer, the term of this patent is extended or adjusted under 35 U.S.C. 154(b) by 104 days.

(21) Appl. No.: 18/762,817

(22) Filed: Jul. 3, 2024

(65) Prior Publication Data

US 2025/0012680 A1 Jan. 9, 2025

(30) Foreign Application Priority Data

Jul. 3, 2023 (KR) ........................ 10-2023-0086088

(51) Int. Cl.
*G01N 1/30* (2006.01)
*G01N 1/28* (2006.01)

(52) U.S. Cl.
CPC ....... *G01N 1/30* (2013.01); *G01N 2001/2893* (2013.01)

(58) Field of Classification Search
CPC ............. G01N 1/30; G01N 2001/2893; G01N 21/278; G02B 21/34; G02B 21/365
See application file for complete search history.

(56) References Cited

U.S. PATENT DOCUMENTS 11,002,667 B2 5/2021 Boamfa et al.
2018/0292311 A1* 10/2018 Boamfa ............... G01N 21/278
2023/0242976 A1* 8/2023 Tentori .................... B01L 3/545 435/6.1
2023/0410944 A1* 12/2023 Vieceli ................. C12Q 1/6869
2025/0313890 A1* 10/2025 Lundeberg ............... G01N 1/34

FOREIGN PATENT DOCUMENTS

JP 2022-066215 A 4/2022
JP 2022-164615 A 10/2022
KR 10-2011-0026972 A 3/2011
KR 10-2022-0038577 A 3/2022
WO WO-2014058064 A1 * 4/2014 ............. G01N 21/78
WO 2021/026338 A1 2/2021

OTHER PUBLICATIONS

English translation—WO 2014058064 A1 (Year: 2014).*
Akahori, Rena et al., "Discrimination of three types of homopolymers in single-stranded DNA with solid-state nanopores through external control of the DNA motion.", Scientific reports 7.1, 2017, pp. 1-14.
Satish Balasaheb Nimese et al., "Immobilization Techniques for Microarray: Challenges and Applications", Sensors 2014, 14, 22208-22229.

(Continued)

*Primary Examiner* — Kara E. Geisel
*Assistant Examiner* — Carlos Perez-Guzman
(74) *Attorney, Agent, or Firm* — Bridgeway IP Law Group, PLLC; Jihun Kim

(57) ABSTRACT

Proposed is an image calibration slide including: a substrate; and an image calibration pattern formed on a surface of the substrate, in which the image calibration pattern is formed by immobilizing and staining a DNA strand.

9 Claims, 5 Drawing Sheets

(56) References Cited

OTHER PUBLICATIONS

Romanov, Valentin et al., "A critical comparison of protein microarray fabrication technologies.", Analyst 139.6 (2014): 1303-1326.
Jae Sung Lee et al., "Surface Patterning", pp. 553-573.
Jahwarhar Izuan Abdul Rashid et al., "The strategies of DNA immobilization and hybridization detection mechanism in the construction of electrochemical DNA sensor: A review", Sensing and Bio-Sensing Research 16, 2017, 19-31.
Ortiz-Hidalgo, Carlos et al., "Hematoxylin: Mesoamerica's gift to histopathology. Palo de Campeche (logwood tree), pirates' most desired treasure, and irreplaceable tissue stain.", International Journal of Surgical Pathology 27.1, 2019, 4-14.
Bhuyan, Rupak et al., "Getting the Stain In: a Quantitative Analysis of DNA and RNA Staining With Various Dyes.".
R. P. Hearn‡ et al., "DNA Extraction Techniques for Use in Education", Biochemistry and Molecular Biology Education vol. 38, No. 3, pp. 161-166, 2010.
"Oligonucleotide Synthesis Methods and Applications to Ensure Yield, Purity, and Cost Objectives", Mettler Toledo, https://www.mt.com/us/en/home/applications/L1_AutoChem_Applications/L2_ReactionAnalysis/oligonucleotide-synthesis.html.

* cited by examiner

IMAGE CALIBRATION SLIDE

CROSS-REFERENCE TO RELATED APPLICATIONS

This application claims priority to and the benefit of Korean Patent Application No. 10-2023-0086088 filed in the Korean Intellectual Property Office on Jul. 3, 2023, the entire contents of which are incorporated herein by reference.

TECHNICAL FIELD

The present invention relates to an image calibration slide, and more particularly, to an image calibration slide for calibrating an image taken in microscopic imaging.

BACKGROUND ART

In digital microscopy fields, such as slide scanners, that perform pathological examinations on tissue, it is necessary to accurately determine the color or shape of the acquired image. Depending on the hardware or software used in the microscope, the actually acquired image is likely to vary depending on an instrument, so calibration of an image taken by the microscope is necessary to standardize the acquired image.

For example, U.S. Pat. No. 11,002,667 discloses calibrating a scanning microscope by using a pixel layout of metal nanostructures spaced apart on a substrate surface. While the calibration slide presented here may be useful in terms of verifying and calibrating the visible light spectrum, there is the problem that it is difficult to determine what color the tissue will exhibit after staining (e.g., Haematoxylin & Eosin (H&E) staining) is performed on the tissue. For example, different tissue properties or reagent concentrations may cause different colors to appear, and it is not easy to determine and calibrate differences in color.

Meanwhile, Korean Patent Application Laid-Open No. 10-2022-0038577 discloses a physical calibration slide including a plurality of etched feature portions. The physical calibration slide presented here may provide shape information through various patterns, but it is impossible to calibrate color information, which has the disadvantage of requiring an additional slide for color calibration.

SUMMARY OF THE INVENTION

The present invention has been made in an effort to provide an image calibration slide capable of performing color calibration and physical calibration by providing color differences due to staining and various shapes or patterns.

An object to be solved in the present invention is not limited to the aforementioned objects, and other objects not-mentioned herein will be clearly understood by those skilled in the art from descriptions below.

An exemplary embodiment of the present invention provides an image calibration slide including: a substrate; and an image calibration pattern formed on a surface of the substrate, in which the image calibration pattern is formed by immobilizing and staining a DNA strand.

In the exemplary embodiment, the image calibration pattern may be formed by immobilizing the DNA strand on a surface of the substrate that has been surface treated to immobilize the DNA strand, and then staining the DNA strand.

In the exemplary embodiment, the surface treatment may be performed on an entire surface of the substrate, and the DNA strand may be immobilized on the surface of the substrate according to the image calibration pattern.

In the exemplary embodiment, the surface treatment may be performed according to the image calibration pattern, and the DNA strand may be immobilized on the surface of the substrate that has been surface treated according to the image calibration pattern.

In the exemplary embodiment, the surface treatment may be performed to immobilize the DNA strand by covalent bond.

Further, the image calibration slide may include at least two image calibration patterns that differ in shape or size from each other.

Further, the image calibration slide may include at least two image calibration patterns that differ in color density from each other.

Further, the image calibration slide may include at least two image calibration patterns that differ in color from each other.

In the exemplary embodiment, the DNA strands immobilized in the at least two image calibration patterns may have different densities.

In the exemplary embodiment, the at least two image calibration patterns may have different dyes from each other.

According to the present invention, there is provided the image calibration slide that is capable of simultaneously performing color calibration and physical calibration.

Furthermore, according to the present invention, it is possible to perform image calibration under various conditions by using patterns using DNA strands or colors according to staining of DNA.

The effects of the present invention are not limited to the effects mentioned above, and other effects not mentioned will be clearly understood by those skilled in the art from the following description.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

Figure 1:
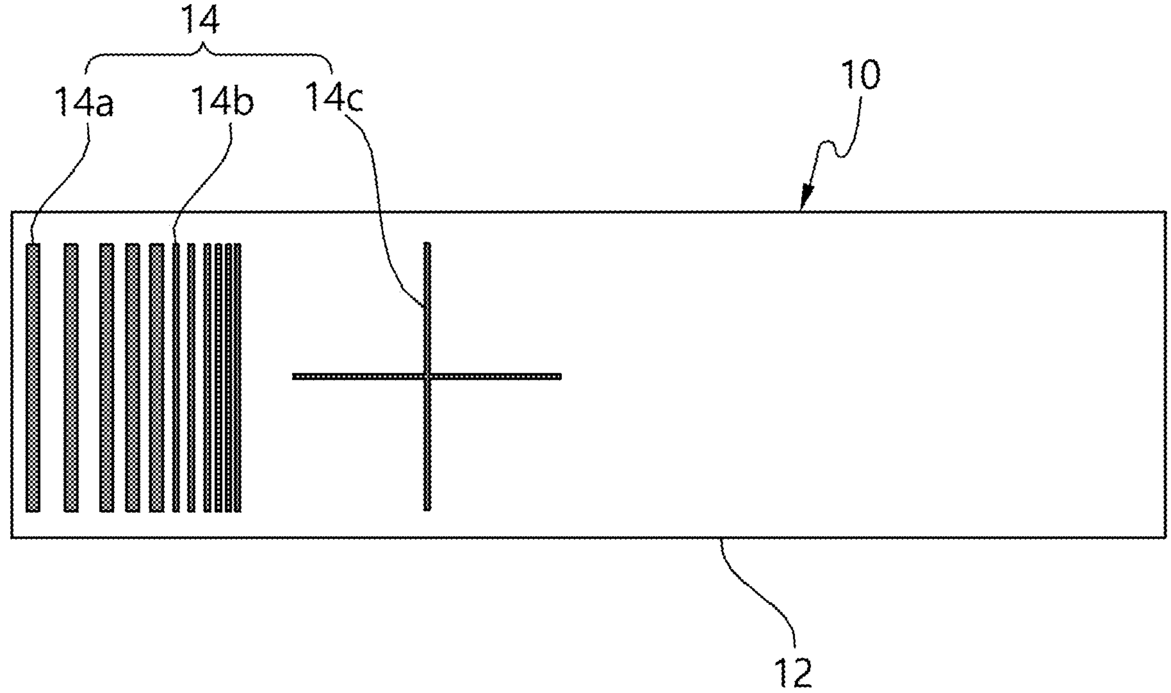
FIG. 1 is a diagram illustrating an image calibration slide according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. Further, in the following description of the present invention, a detailed description of known configurations or functions incorporated herein will be omitted when it is judged that the detailed description may make the subject matter of the present disclosure unclear. It should be understood that although the exemplary embodiment of the present invention is described hereafter, the spirit of the present invention is not limited thereto and the present invention may be changed and modified in various ways by those skilled in the art.

FIG. 1 is a diagram illustrating an image calibration slide according to an exemplary embodiment of the present invention.

An image calibration slide 10 according to an exemplary embodiment of the present invention includes a substrate 12 and an image calibration pattern 14 formed on the substrate 12. In the present invention, the image calibration pattern 14 may be provided in plural in a predetermined shape or in various shapes.

The substrate 12 may be made of a transparent material or a partially transparent or translucent material. The substrate may be manufactured by using glass, silicone, or plastic resins. In some cases, the substrate 12 may include metallic coating, such as Au, or may be formed of a metallic material.

The image calibration pattern 14 may be formed to have various shapes and figures, such as a 1-shaped pattern 14*a* with a predetermined width, a 1-shaped pattern 14*b* with a narrower width, and a +-shaped pattern 14*c*, as illustrated in FIG. 1. The image calibration pattern may be variously set depending on the imaging system or calibration purpose and is not limited to the patterns illustrated in FIG. 1.

In one exemplary embodiment, the image calibration pattern 14 may be formed by forming a pattern with DNA strands and staining the DNA strands to exhibit the stained color.

Figure 2:
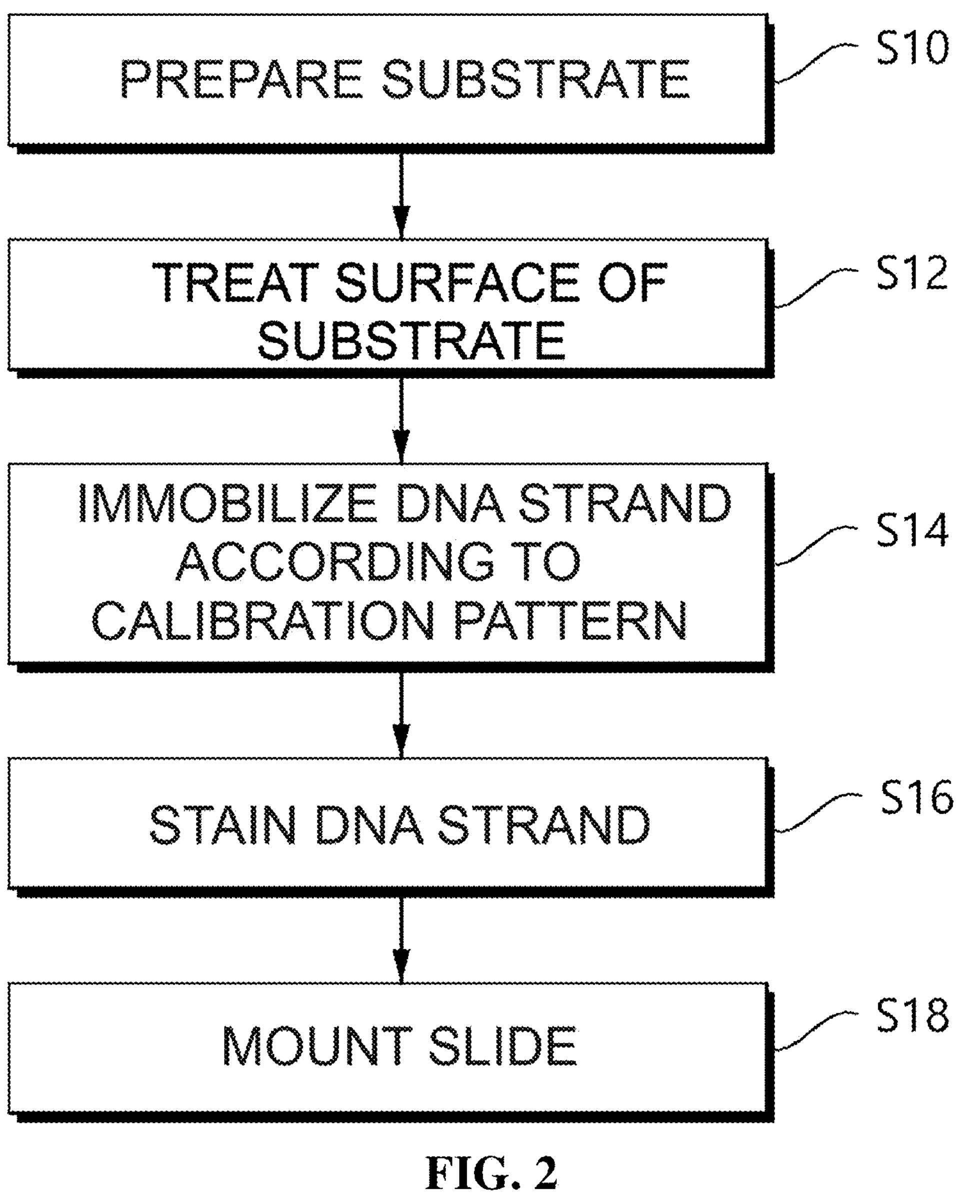
FIG. 2 is a flowchart illustrating a method of fabricating an image calibration slide according to an exemplary embodiment of the present invention.

FIG. 2 is a flowchart illustrating a method of fabricating an image calibration slide according to an exemplary embodiment of the present invention.

The substrate 12 is prepared to fabricate the image calibration slide 10 (S10).

A surface of the substrate 12 is treated to immobilize DNA strands on the surface of the substrate 12 (S12). Methods for immobilize the DNA strand may include physical adsorption using electrostatic attraction, immobilization using covalent bonds, and immobilization using non-covalent bonds, such as streptavidin-biotin interactions.

For example, when the DNA strands are immobilized on the surface of the substrate 12 made of a glass material by covalent bond, the surface of the substrate may be treated to make the Si—OH groups on the glass surface react with an amine group (—$NH_2$) or carboxyl group (—COOH) of the DNA. The surface treatment of the substrate may be accomplished by coating the surface of the substrate with carboxyl (with EDC, —COOH, carboxyl with EDC), aldehyde (—CHO), isocyanate (—N═C═S), mercaptosilane (—Si—R—SH), and the like.

Next, the DNA strand is immobilized to the surface of the substrate 12 according to a calibration pattern (S14). The DNA strand is immobilized to the surface of the substrate 12 according to the image calibration pattern 14 on the substrate 12.

In the exemplary embodiment, when a coating for covalent bond is present on the surface of the substrate 12, the DNA strand may be immobilized to the surface of the substrate 12 by covalently bonding an amine group or carboxyl group of the DNA strand to a functional group on the surface of the substrate 12.

As one example of immobilizing the DNA strand in a predetermined pattern to the surface of the substrate 12, a Continuous Flow Microspotter (CFM) may be used.

Figure 3:
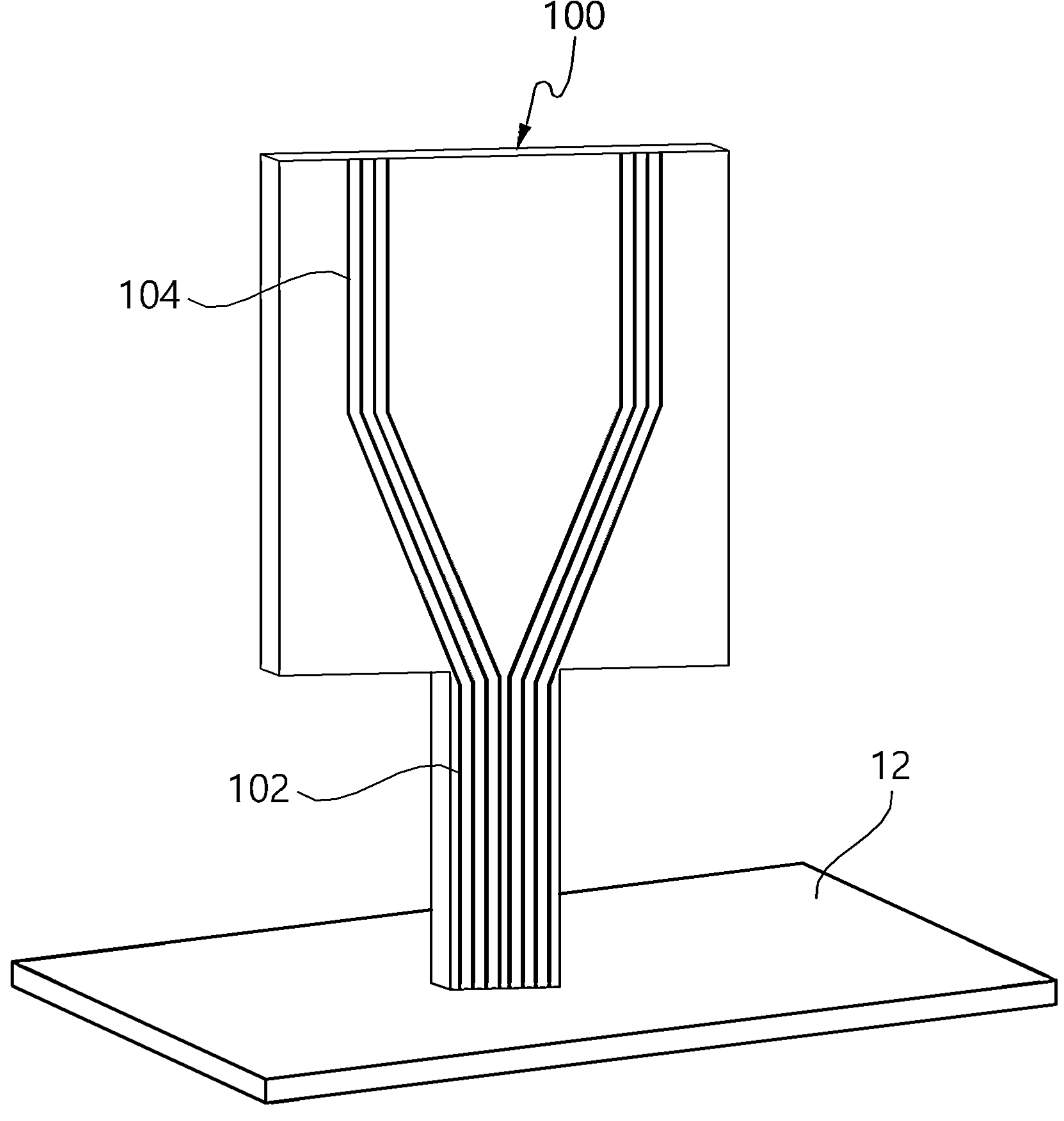
FIG. 3 is a diagram illustrating a process of forming a DNA strand pattern on a surface of a substrate by using a Continuous Flow Microspotter (CFM).

FIG. 3 is a diagram illustrating a process of forming a DNA strand pattern on the surface of the substrate by using a CFM. Referring to FIG. 3, a fluid containing the DNA strand is circulated to the surface of the substrate 12 in the state where a CFM printer head 100 is in contact with the surface of the substrate 12. A tip 102 of the CFM printer head 100 is in close contact with the surface of the substrate 12, and the fluid containing the DNA strand is supplied to the surface of the substrate 12 through a fluid channel 104 to cause the DNA strand to be immobilized on the surface of the substrate 12. The CFM printer head 100 moves relative to the substrate 12 along the image calibration pattern 14 that is to be formed on the substrate 12, so that the DNA strand may be immobilized to the surface of the substrate 12 in the form of the image calibration pattern 14.

The DNA strand may be extracted from real cells or synthetic DNA may be used. The purpose of the present invention is to provide the image calibration slide 10 by staining the DNA strand to exhibit a predetermined pattern or color, so the sequence of the DNA strand may not be critical.

When DNA is extracted from cells, the extracted DNA may be treated with an appropriate restriction enzyme to reduce the long DNA strand to DNA fragments of a suitable length for use. When synthetic DNA is used, DNA, such as synthetic oligonucleotides, may be synthesized and used.

After the DNA strand is immobilized to the surface of the substrate 12 according to the image calibration pattern 14, the DNA strand is stained by using a dye (S16).

For staining the DNA strand, conventional DNA staining methods, such as Hematoxylin & Eosin (H&E) staining, may be used. Additionally, a predetermined color may be given to the image calibration pattern 14 by adding a mordant to hematoxylin and staining the DNA. For example, when aluminum is used as a mordant, the DNA strand is stained to exhibit blue-purple, and when iron is used as a mordant, the DNA strand is stained to exhibit black or black-blue. In addition, methylene blue that is a cationic dye used to stain nucleic acids may be used to stain the DNA strand. It is a matter of course that in the implementation of the present invention, various dyes for staining the DNA strand may be used in addition to the above examples.

After the staining of the DNA strands is completed, a mounting medium may be applied to the surface of the substrate 12 to complete the fabrication of the image calibration slide 10 (S18). In some cases, it may be possible to add a coverslip or film made of a transparent material to the upper part of the slide 10 applied with a mounting medium.

The above description describes performing the surface treatment on the entire substrate in operation S12, followed by immobilizing the DNA strand according to the calibration pattern in operation S14. However, in the implementation of the present invention, it may also be possible to perform the surface treatment only on the portion corresponding to the calibration pattern in operation S12, and then immobilize the DNA strand on the surface of the surface treated substrate 12 according to the calibration pattern in operation S14.

Figure 4:
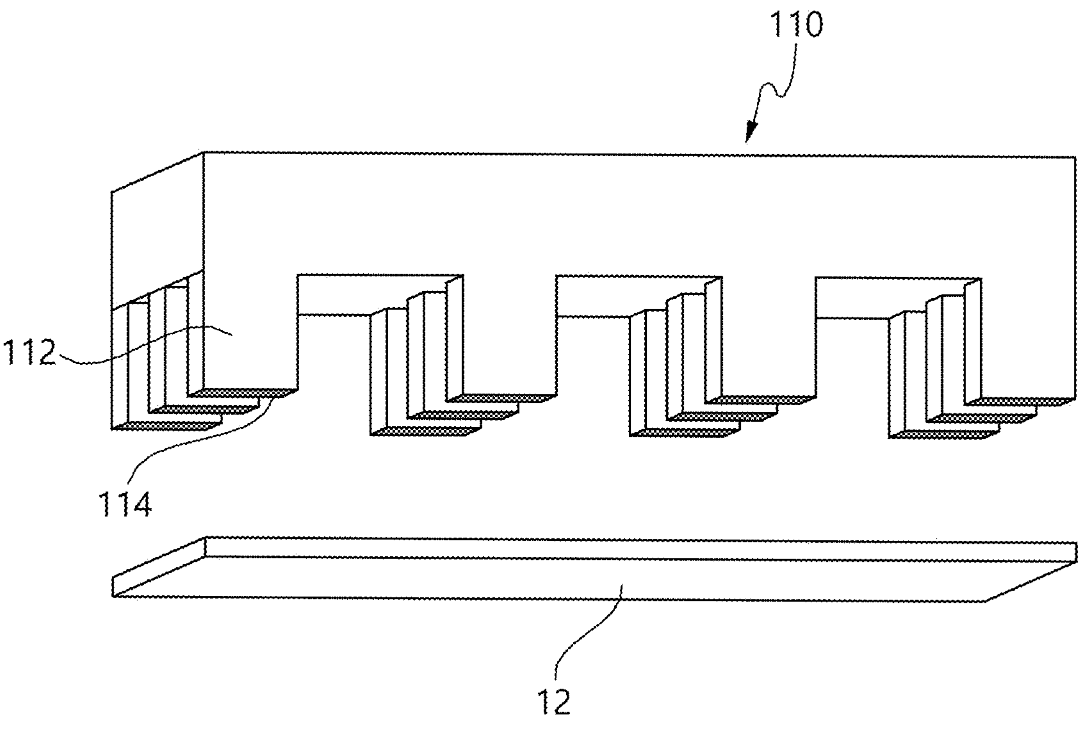
FIG. 4 is a diagram illustrating an example of surface treatment of a substrate according to a calibration pattern to fabricate the image calibration slide according to the exemplary embodiment of the present invention.

FIG. 4 is a diagram illustrating an example of surface treatment of a substrate according to a calibration pattern to prepare the image calibration slide according to the exemplary embodiment of the present invention.

A treatment solution 114 capable of immobilizing the DNA strand on the surface of the substrate 12 may be printed by using a microstructured stamp 110 having a micro-protrusion structure 112. FIG. 4 illustrates an example of the micro-protrusion structure 112, and the micro-protrusion structure 112 may be configured to correspond to the image calibration pattern 14 formed on the substrate 12. The micro-stamp 110 may be constructed by any method known in the art by manufacturing a mold through a semiconductor process and using a material, such as polydimethylsiloxane (PDMS).

The surface of the substrate 12 may be treated along the image calibration pattern 14 by applying the treatment solution 114 to an end portion of the micro-protrusion structure 112 of the micro-stamp 110 and making the micro-stamp 110 be in contact with the substrate 12.

The surface of the substrate 12 may then be supplied with a fluid containing the DNA strand, or the DNA strand may be immobilized according to the image calibration pattern 14. After the DNA strand is immobilized, a wash solution may be supplied to the surface of the substrate 12 to remove the DNA strand that is not immobilized on the substrate 12.

Figure 5:
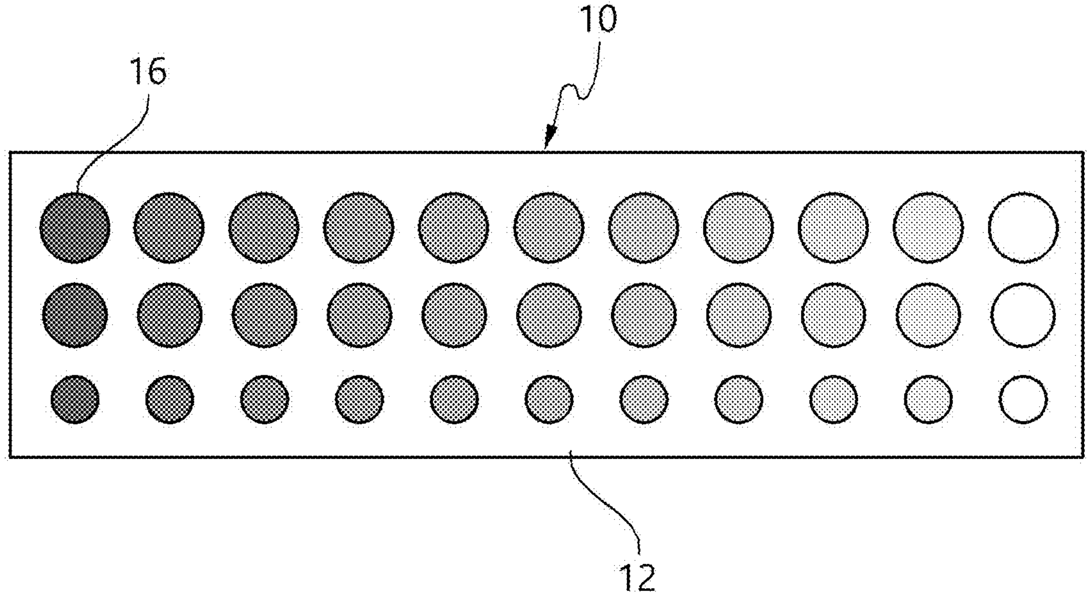
FIG. 5 is a diagram illustrating an image calibration slide according to another exemplary embodiment of the present invention.

FIG. 5 is a diagram illustrating an image calibration slide according to another exemplary embodiment of the present invention.

The image calibration slide 10 illustrated in FIG. 5 includes a substrate 12 and a spot-shaped image calibration pattern 16 formed on the substrate 12. Referring to FIG. 5, the image calibration pattern 16 may be arranged in an array form and may have different concentrations of color.

In the exemplary embodiment, the color density of the image calibration pattern 16 may be adjusted by varying the number of DNA strands per unit area that are immobilized on the image calibration pattern 16. Here, the number of DNA strands per unit area immobilized on the image calibration pattern 16 may be adjusted by varying the concentration of DNA strands in a fluid containing the DNA strands supplied to the image calibration pattern 16.

Further, in the implementation of the present invention, it may be possible to stain different image calibration patterns formed on the surface of one substrate 12 with different dyes in operation S16 of FIG. 2. In one exemplary embodiment, a micro-channel may be utilized to supply a dye only for individual image calibration patterns formed on the surface of the substrate. It may also be possible to use the CFM illustrated in FIG. 3 as a configuration for supplying a dye only to a specific image calibration pattern area.

The present invention is characterized by providing the image calibration slide 10 by immobilizing and staining DNA strands in a predetermined pattern on a substrate surface.

In the present invention, a plurality of image calibration patterns may be formed on the image calibration slide, to be utilized for physical calibration of an image processing device, such as a slide scanner. Furthermore, color calibration of an image processing device may be performed by adjusting the density of DNA strands immobilized on different image calibration patterns formed on the image calibration slide, or by changing the color density or changing the color by staining DNA strands with different dyes. Accordingly, calibration of the image processing device under various conditions and states may be performed with one image calibration slide.

On the other hand, the image calibration pattern formed on the image calibration slide according to the present invention may be formed to have various shapes, sizes, or resolutions as required.

Furthermore, the image calibration slide according to the present invention enables multiple slides to be produced by the same method, and the fabricated image calibration slide may have accuracy within a predetermined error range. Accordingly, when periodic calibration is required for an image processing device that has been initially calibrated, the image calibration slide according to the present invention may be used as a standard for determining the accuracy of the calibration for the corresponding device.

Although the exemplary embodiment of the present disclosure has been described for illustrative purposes, those skilled in the art will appreciate that various modifications, additions and substitutions are possible, without departing from the essential characteristic of the invention. Therefore, the exemplary embodiments disclosed in the present disclosure and the accompanying drawings are not intended to limit the technical spirit of the present disclosure, but are intended to illustrate the scope of the technical idea of the present disclosure, and the scope of the present disclosure is not limited by the exemplary embodiment and the accompanying drawings. The scope of the present disclosure shall be construed on the basis of the accompanying claims in such a manner that all of the technical ideas included within the scope equivalent to the claims belong to the scope of the present disclosure.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An image calibration slide, comprising:

a substrate; and an image calibration pattern formed on a surface of the substrate, wherein the image calibration pattern is formed by immobilizing and staining a DNA strand, wherein the image calibration slide comprises at least two image calibration patterns that differ in color density from each other, and wherein DNA strands immobilized in the at least two image calibration patterns have different densities.

2. The image calibration slide of claim 1, wherein the image calibration pattern is formed by immobilizing the DNA strand on the surface of the substrate that has been subjected to a surface treatment to immobilize the DNA strand, and then staining the DNA strand.

3. The image calibration slide of claim 2, wherein the surface treatment is performed on an entire surface of the substrate, and the DNA strand is immobilized on the surface of the substrate according to the image calibration pattern.

4. The image calibration slide of claim 2, wherein the surface treatment is performed according to the image calibration pattern, and the DNA strand is immobilized on the surface of the substrate that has been surface treated according to the image calibration pattern.

5. The image calibration slide of claim 2, wherein the surface treatment is performed to immobilize the DNA strand by covalent bond.

6. The image calibration slide of claim 1, comprising: the at least two image calibration patterns that differ in shape or size from each other.

7. The image calibration slide of claim 2, comprising: the at least two image calibration patterns that differ in shape or size from each other.

8. The image calibration slide of claim 1, comprising: the at least two image calibration patterns that differ in color from each other.

9. The image calibration slide of claim 1, wherein the at least two image calibration patterns have different dyes from each other.

* * * * *